United States Patent
Conan et al.

(10) Patent No.: US 11,412,309 B2
(45) Date of Patent: Aug. 9, 2022

(54) METHOD FOR MANAGING THE CONNECTIONS OF AN ELECTRONIC DEVICE

(71) Applicant: ORANGE, Issy-les-Moulineaux (FR)

(72) Inventors: Martin Conan, Chatillon (FR); Jean-Bernard Leduby, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/770,437

(22) PCT Filed: Dec. 3, 2018

(86) PCT No.: PCT/FR2018/053090
§ 371 (c)(1),
(2) Date: Jun. 5, 2020

(87) PCT Pub. No.: WO2019/110906
PCT Pub. Date: Jun. 13, 2019

(65) Prior Publication Data
US 2020/0389706 A1    Dec. 10, 2020

(30) Foreign Application Priority Data
Dec. 5, 2017  (FR) ...................................... 1761619

(51) Int. Cl.
*H04N 21/488*  (2011.01)
*H04N 21/436*  (2011.01)
(Continued)

(52) U.S. Cl.
CPC ... *H04N 21/4882* (2013.01); *H04N 21/43615* (2013.01); *H04N 21/4424* (2013.01); *H04N 21/44227* (2013.01); *H04N 21/47202* (2013.01)

(58) Field of Classification Search
CPC ....... H04N 21/43615; H04N 21/47202; H04N 21/44222; H04N 21/4126; H04N 21/4432
See application file for complete search history.

(56) References Cited

U.S. PATENT DOCUMENTS 5,883,621 A * 3/1999 Iwamura .......... H04N 21/42204
725/37
9,479,807 B1 * 10/2016 Bugajski ................ H04N 21/84
(Continued)

OTHER PUBLICATIONS

International Search Report dated Apr. 11, 2029 for corresponding International Application No. PCT/FR2018/053090, filed Dec. 3, 2018.

(Continued)

*Primary Examiner* — Jason Salce
(74) *Attorney, Agent, or Firm* — David D. Brush; Westman, Champlin & Koehler, P.A.

(57) ABSTRACT

A method for managing connections of a multimedia content processing device having at least two different connections for providing at least one function. The method includes the following acts, implemented on the processing device: receiving a request to process multimedia content; analyzing the request so as to extract therefrom at least one characteristic of the content; obtaining a current connection for the at least one function of the device; verifying appropriateness of the at least one characteristic of the content in relation to the current connection; and, depending on the results of the verification, emitting a warning message in order to alter the current connection for the at least one function of the device to a new current connection.

15 Claims, 2 Drawing Sheets

(51) Int. Cl.
*H04N 21/442* (2011.01)
*H04N 21/472* (2011.01)

(56) References Cited

U.S. PATENT DOCUMENTS

| | | | |
|---|---|---|---|
| 2001/0019956 A1* | 9/2001 | Tada | H04W 52/0232 455/434 |
| 2002/0040399 A1* | 4/2002 | Nagashima | H04L 67/10 709/227 |
| 2002/0136298 A1* | 9/2002 | Anantharamu | H04N 21/2402 375/240.12 |
| 2004/0158878 A1* | 8/2004 | Ratnakar | H04N 19/59 725/150 |
| 2008/0192820 A1 | 8/2008 | Brooks et al. | |
| 2008/0240146 A1* | 10/2008 | Singh | H04N 21/43637 370/458 |
| 2009/0232480 A1* | 9/2009 | Jendbro | H04N 21/41407 386/224 |
| 2009/0313484 A1 | 12/2009 | Millet et al. | |
| 2011/0099594 A1* | 4/2011 | Chen | H04N 21/4516 725/105 |
| 2011/0116772 A1* | 5/2011 | Kwon | H04N 21/2402 386/343 |
| 2013/0044264 A1 | 2/2013 | Hymel | |
| 2013/0246631 A1* | 9/2013 | Gonzales | H04L 65/80 709/227 |
| 2016/0057489 A1* | 2/2016 | He | H04N 21/8456 725/14 |
| 2016/0156944 A1* | 6/2016 | Hattori | H04N 21/84 725/116 |
| 2017/0019443 A1 | 1/2017 | Conan et al. | |
| 2017/0155938 A1 | 6/2017 | Wallters et al. | |
| 2017/0269664 A1 | 9/2017 | Garner et al. | |
| 2019/0174185 A1* | 6/2019 | Leduby | H04N 21/4436 |

OTHER PUBLICATIONS

Written Opinion of the International Searching Authority dated Apr. 24, 2029 for corresponding International Application No. PCT/FR2018/053090, filed Dec. 3, 2018.

Xavier Ducloux et al. "Thomson Viedo Networks' Response to the Call for Proposals on Green MPEG" 105. MPEG Meeting; Jul. 29, 2013-Aug. 2, 2013; Vienna; (Motion Picture Expert Group or ISO/IEC JTC1/SC29/WG11), No. m30507, Jul. 28, 2013 (Jul. 28, 2013), XP030059034.

Motion Picture Expert Group Or Iso/iec Jtc 1/sc29/wg11. "ISO/IEC DIS 23008-1 Information technology—Green Video Contents, document nr. w14131", Output Document of the 107th MPEG Meeting, San Jose, US, Jan. 13-17, 2014, Jan. 23, 2014 (Jan. 23, 2014), pages i-iv, 1-43, Retrieved from the Internet on Oct. 15, 2014, XP055146770.

English translation of French Preliminary Search Report, Written Opinion and Certificate of translation for French Application No. 1761619, dated Jun. 26, 2020.

* cited by examiner

METHOD FOR MANAGING THE CONNECTIONS OF AN ELECTRONIC DEVICE

CROSS-REFERENCE TO RELATED APPLICATIONS

This Application is a Section 371 National Stage Application of International Application No. PCT/FR2018/053090, filed Dec. 3, 2018, which is incorporated by reference in its entirety and published as WO 2019/110906 A1 on Jun. 13, 2019, not in English.

TECHNICAL FIELD

The invention relates to a system and method for managing the connections of an electronic device.

The invention applies to any device that has variable requirements in terms of connectors, in particular electrical or network connectors. It is intended in particular for multimedia devices.

PRIOR ART

The connection requirements of an electronic device (digital decoder, smartphone, etc.), and in particular with regard to electrical power and the volume of computer data exchanged over a network, generally depends on the modules and/or applications used at a given time on such a device. The requirements of a multimedia decoder may, for example, vary depending on the type and resolution of the multimedia content being processed, the type of calculations it has to perform, etc.

However, a user of such a device cannot know a priori whether the power supply of their device, the type of connection to the network, to the rendering device, etc. are suitable at a given time.

Thus, the device will fail to provide the expected application if the resources are not sufficient, or provide it in a degraded manner. In the case of a multimedia decoder (STB—set-top box, PC software decoder, TV stick, etc.), if the connections of the device are not suitable, it may not render the required multimedia content, or render it with pauses, jerkily, etc.

Certain solutions make it possible to adapt to the bandwidth available on the network, and in particular the techniques of adaptive streaming. However, the quality provided to the user is not necessarily that which they expect. In addition, this type of technique only adapts to the capabilities of the available bandwidth, and hence the capabilities of the network. In the event of an insufficient electrical connection, this type of technique cannot adapt correctly.

The invention provides a solution which does not have the drawbacks of the prior art.

THE INVENTION

To this end, according to one functional aspect, one subject of the invention is a method for managing the connections of a device for processing multimedia content that has at least two distinct connections for providing at least one function, said method being characterized in that it includes, on the processing device, the steps of:
receiving a request to process a multimedia content;
analyzing the request to extract therefrom at least one characteristic of said content;
obtaining a current connection for said at least one function of the device;
checking the adequacy between said at least one characteristic of the content and the current connection;
depending on the results of the check, sending an alert message to change the current connection for said at least one function of the device to a new current connection.

What is meant by connection of a processing device is an interface (a cable, a network link, etc.) that allows the device to connect to the outside, in particular over a network (electrical, data or rendering network).

What is meant by function is a functionality of the device that can be provided by such a connection (power or data supply, sound or visual rendering).

What is meant by multimedia content is content that may contain one or more media (audio, video, graphics, text, sound, etc.) with which media characteristics are associated (spatial or temporal resolution, bit rate, frequency, sampling, coding type, coding format, etc.)

What is meant by changing the current connection is adding, removing or changing a current connection relating to the function to be provided, for example the connection to the electrical mains, to a local area network or to an external monitor.

Thus, the invention affords the advantage of being able to easily alert a user that the current connection(s) of their device are not suitable for providing the requested service. In particular, depending on the characteristics of the multimedia content, a certain number of connections may be required: connection to the mains (electrical connection), connection to the network by wire (Ethernet), etc. Thus, unlike the prior art for which the service is not provided if the required connections are not provided, or is provided in a degraded manner (by reducing, for example, the data rate to remove the need for a wired connection), the invention advantageously makes it possible to alert the user, by sending an appropriate message, that the service will be able to be provided on condition that one or more equipment connections are modified.

According to one particular implementation of the invention, a method as described above is characterized in that the function relates to the power supply of the device.

This implementation of the invention makes it possible to alert the user that the power supply is not sufficient to provide a requested multimedia service when the device includes a plurality of possible power supply modes. Specifically, an electronic device may be supplied with power via a battery, a mains power supply, a serial (USB) or HDMI-MHL wired power supply, wirelessly by carrier currents, etc. A given type of power supply may not be adequate to provide the requested multimedia service (because the power, frequency, etc. of the power source are unsuitable).

According to one variant of this first implementation, the new current connection is a serial or mains connection.

This variant implementation of the invention makes it possible to alert the user that they may switch from a serial, typically USB, power supply mode to a mains power supply mode and vice versa, or add a USB connection for a device that runs on battery, etc. This variant is particularly advantageous for a small device such as for example a TV stick, when the processing of the multimedia content requires an amount of power greater than that which can be delivered by a battery or a serial power supply.

According to a second particular implementation of the invention, which may be implemented as an alternative to or together with the preceding implementation, a method such as described above is characterized in that the function relates to the data network access of the device.

This implementation of the invention makes it possible to alert the user that the network connection is not sufficient to provide a requested multimedia service when the device includes a plurality of possible modes of connection to the network. Specifically, an electronic device may be connected to a network via a wireless link (Wi-Fi, Bluetooth, Li-Fi, etc.), or via a wired link (Ethernet, optical cable, power-line communication, fiber, etc.). A given type of network connection may not be adequate to provide the requested multimedia service (because the bit rate, latency, etc. on the network are unsuitable).

According to one variant of this second implementation, the new current connection is a wired connection.

This variant implementation of the invention makes it possible to alert the user that they may switch from a wireless network connection mode to a wired connection mode, typically Ethernet, and vice versa. This variant is particularly advantageous when the multimedia content requires a bandwidth greater than that which can be delivered by wireless radio link.

According to another particular implementation of the invention, which may be implemented as an alternative to or together with the preceding implementations, a method such as described above is characterized in that the function relates to the device rendering multimedia data.

This implementation of the invention makes it possible to alert the user that the display (or the sound rendering) of the processing device is not sufficient to provide a requested multimedia service when the device includes a plurality of possible modes of connection to a rendering device, in particular an external device. Specifically, an electronic device may have its own display but still be connected to an external display such as a PC screen, standard TV, high definition TV, etc. via a VGA or HDMI connection, etc. A given connection type (for example, VGA) may not be adequate to provide the requested multimedia service (because the screen resolution, data acquisition speed, etc. are unsuitable). In this case it is advantageous to be able to alert the user that they may change connection type (e.g. switch to HDMI) and/or monitor for the service to be provided correctly.

According to another particular implementation of the invention, which may be implemented as an alternative to or together with the preceding implementations, a method such as described above is characterized in that the request is a request for the progressive download of a multimedia content and in that the step of analyzing the request includes the following substeps:

obtaining a file describing the content;
analyzing the file to extract therefrom at least one characteristic of said content.

This implementation of the invention makes it possible to benefit from the advantages of an adaptive streaming (or progressive download) method for access to the content, and in particular from the presence of a file describing the content, which makes it very easy to acquire the characteristics of the content to be rendered (bit rate, coding, frequency, resolutions, etc.). If for example the user requires high-definition content, access to such a file describing the content makes it possible to immediately retrieve the characteristics of the high-definition content before accessing it.

According to another particular implementation of the invention, which may be implemented as an alternative to or together with the preceding implementations, a method such as described above is characterized in that the request to process the content is received from a control terminal and the alert message is sent to said control terminal for the rendering thereof.

Advantageously according to this implementation, it is the terminal which has sent the request to the processing device (for example, a smartphone sending a request to load content to a TV stick or an STB) which will receive in return the message informing it that the connections of the device are insufficient. As this is generally the user's terminal, they will be able to react quickly.

According to another particular implementation of the invention, which may be implemented as an alternative to or together with the preceding implementations, a method such as described above is characterized in that the processing device is connected to a content rendering device, and the alert message is sent to said rendering device.

Advantageously according to this implementation, it is the terminal displaying the content, connected to the processing device (for example, a TV rendering the content streamed by a TV stick) which will receive the message informing it that the connections of the device are insufficient. Since it is generally the terminal in front of which the user is waiting for the content to be rendered, they will be able to react quickly.

According to another particular implementation of the invention, which may be implemented as an alternative to or together with the preceding implementations, a method such as described above is characterized in that the characteristic of the content is a coding characteristic.

Advantageously according to this mode, it is a coding characteristic of the multimedia content, for example of the video media of a TV channel, which is considered when characterizing the content. Specifically, the method for coding a content greatly affects the capabilities required on the part of the processing device, in particular with regard to its power supply (it consumes more power if it uses a more complex decoding technique), its useful bit rate (it needs more bandwidth if it uses a coding technique aimed at high bit rates) and the resolution of its display or of the display connected thereto.

According to another particular implementation of the invention, which may be implemented as an alternative to or together with the preceding implementations, a method such as described above is characterized in that the characteristic of the content is a bit rate characteristic.

Advantageously according to this implementation, it is a bit rate characteristic of the multimedia content, for example of the video media of a TV channel, which is considered when characterizing the content. Specifically, the useful bit rate of a content greatly affects the capabilities required on the part of the processing device, in particular with regard to its connection to the network (it needs a wired connection if the bandwidth is high), its power supply (it needs more power if it has to decode more data), and its connection to an external rendering device (it needs a high definition television if it has to process data corresponding to this bit rate).

According to one hardware aspect, the invention also relates to a device for processing multimedia content that has at least two distinct connections for providing at least one function, said device being characterized in that it includes:

a module for receiving a request to process a multimedia content;
a module for analyzing the request to extract therefrom at least one characteristic of said content;

a module for obtaining a current connection for said at least one function of the device;

a module for checking the adequacy between the characteristic of the content and the current connection;

a module for sending, depending on the results of the check, an alert message to change the current connection for said at least one function of the device to a new current connection.

The term module may correspond both to a software component and to a hardware component or a set of hardware and software components, a software component corresponding itself to one or more computer programs or subroutines or more generally to any element of a program capable of implementing a function or a set of functions as described for the modules in question. In the same way, a hardware component corresponds to any element of a hardware assembly capable of implementing a function or a set of functions for the module in question (integrated circuit, chip card, memory card, etc.).

According to another hardware aspect, the invention also relates to a TV stick comprising a processing device such as presented above.

According to another hardware aspect, the invention also relates to a system comprising a processing device such as claimed above, a control terminal and a rendering terminal.

According to another hardware aspect, the invention also relates to a computer program capable of being implemented in a device such as defined above, the program comprising code instructions which, when the program is executed by a processor, carry out the steps of the method defined above.

The subjects according to the hardware aspects of the invention afford at least the same advantages as those afforded by the method according to the first aspect. The optional features given for the first aspect may be applied in terms of the method.

This program may use any programming language, and be in the form of source code, object code, or intermediate code between source code and object code, such as in a partially compiled form, or in any other desirable form.

According to yet another hardware aspect, the invention relates to a recording medium readable by a data processor on which a program comprising program code instructions for carrying out the steps of the method defined above is recorded.

The information medium may be any entity or device capable of storing the program. For example, the medium may include a storage means, such as a ROM, for example a CD ROM or a microelectronic circuit ROM, or a magnetic recording means, for example a hard disk. Furthermore, the information medium may be a transmissible medium such as an electrical or optical signal, which may be routed via an electrical or optical cable, by radio or by other means. The program according to the invention may in particular be downloaded from a network such as the Internet. Alternatively, the information medium may be an integrated circuit into which the program is incorporated, the circuit being suitable for carrying out or for being used in carrying out the method in question.

The invention will be better understood on reading the description which follows, provided by way of example and with reference to the appended drawings.

THE FIGURES

DETAILED DESCRIPTION OF ONE EXEMPLARY EMBODIMENT ILLUSTRATING THE INVENTION

Figure 1:
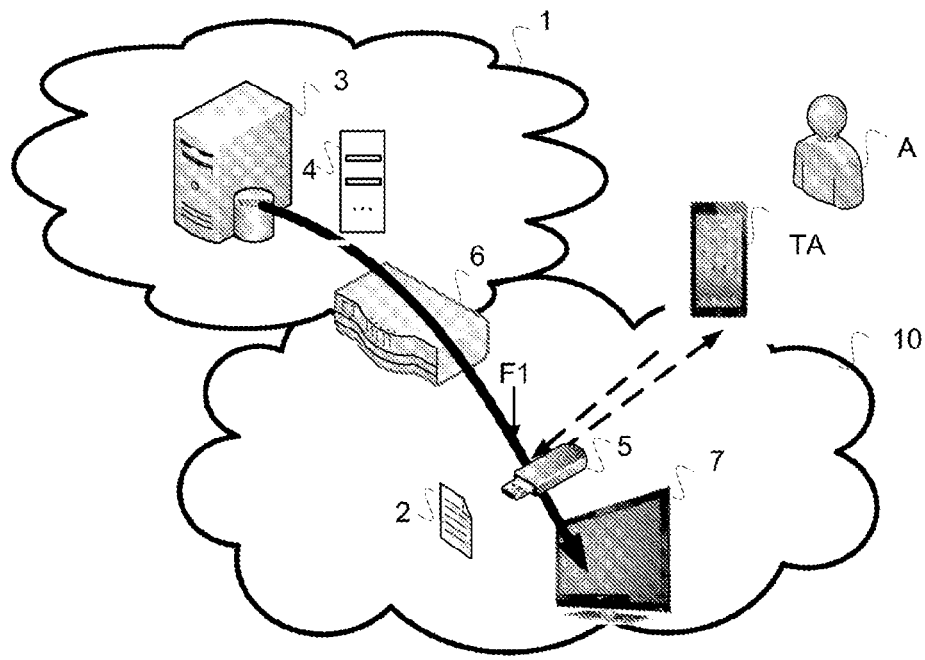
FIG. 1 shows one embodiment of the invention in which the device is a digital decoder taking the form of an electronic stick.

FIG. 1 shows one embodiment of the invention in which the device is a digital decoder taking the form of an electronic stick (5) in a local area network (10) of a user (A), connected to the wide area network (WAN, 1) via a service gateway (6).

It is recalled here that a local area network, also called a home network, is a computer network which links together, by wire or wirelessly, the terminals of a house (computers, peripherals for printing, for rendering, for storage, etc.) that are able to communicate with one another. A home network generally includes router equipment, also commonly called a home gateway, or service gateway (6), an intermediate element for redirecting, or routing, the data packets between the various terminals and the networks which are connected thereto. Such a home network often connects the various terminals using wireless Wi-Fi or wired Ethernet technology, the two types of support being provided for communications based on protocols from the IP (Internet Protocol) family. Hereinafter, what is meant by terminal device, or just "terminal", is any device capable of connecting by wire or wirelessly to the gateway (6).

The context of the home local area network (10) is given by way of example and could easily be transposed to that of a corporate network.

The local area network (10) according to this embodiment of the invention comprises a terminal TA of the user A, and a rendering device (7), or more simply a television (TV), associated with a TV stick (5, CTV) connected to the local area network (10) via the service gateway (6) responsible for downloading content over the WAN network (1). The terminals of the local area network are able to establish connections with the WAN via the service gateway (6) which is connected thereto by a high speed link. The network (10) is for example an IP local area network and the high speed link is an ADSL (Asymmetric Digital Subscriber Line) link. The WAN network (1) is also an IP network in this example and contains multimedia content servers (3) which host in particular digital content available to the terminals of the local area network (10) in streaming mode. The content server (3) is, according to this example, in the WAN (1) but it could, according to another example, be located in a local area network, for example at the service gateway (6) or any other equipment capable of hosting such a content server.

In FIG. 1, the solid arrow (F1) represents the path of a content from the content server (3) to the television (7), passing through the service gateway (6) then the stick CTV (5).

The terminal TA is for example a smartphone or an electronic tablet. The terminal TA is able to transmit a download order to the stick CTV, which order comprises a download address for the content server (3). The user chooses to receive a content (C) by streaming. The service gateway (6) connects to the content server (3) of the wide area network (1) over which it retrieves the streamed content. The stick CTV (5) receives the streamed content and the service starts, that is to say the stick can receive the content and display it on the television, typically using what is known as an "adaptive streaming" technique (HAS for "HTTP Adaptive Streaming") well known to those skilled in the art. There are several technical solutions in this area, such as for example the proprietary solutions Microsoft Smooth Streaming, Apple HLS, Adobe Http Dynamic Streaming or the MPEG-DASH standard from ISO/IEC, which will be described below. The client terminal generally makes a request in two steps: a first step consists in downloading a document describing the parameters for accessing the service via the HTTP (Hyper Text Transport Protocol) protocol, a client-server communication protocol developed for internet networks and in particular the Web. This document contains a set of descriptive information on the content accessible at a certain address on a content server. Hereinafter, it will be referred to by the expression "description file" and it will be assumed for simplicity's sake that it is on the same server (3) as the content. Conventionally, this file provides different streams for the same video, corresponding for example to different bit rates, different resolutions, different qualities. In a second step, the client terminal accesses the content on the server and the service effectively starts, that is to say the client terminal can receive and process the content.

One example of such a description file, a manifest file (abbreviated as MPD) inspired by the MPEG-DASH standard, is provided in annex 1. For more details, reference may be made to the most recent version of ISO/IEC standard 23009-1. This simplified manifest file describes digital content in an XML syntax ("eXtended Markup Language"), comprising a list of content in the form of fragments conventionally described between an opening tag (< >) and a closing tag </>. Each fragment corresponds to a certain duration with several levels of quality. The following tags are of particular interest for this embodiment of the invention:

Adaptation Set contains the description of a multimedia stream (for example, the whole video, part of the video, audio in a certain language, subtitles, etc.) In this example:
  the first Adaptation Set describes the video of the content in MPEG4 coding format and at standard (SD) resolutions at 1 Mbit/s and 720p at 3.2 Mbit/s.
  the second describes the video in HEVC coding format and at HD resolution (1080p) at 10 Mbit/s.
BaseURL indicates an address for accessing the content via a URL (Uniform Resource Locator), at different levels in the hierarchy of the MPD file. In this example, these tags indicate the address of the content server 3 (http://server.com) then the address of the streams, coded in MPEG4 format (video/h264) and/or in HEVC format (video/h265), respectively;
SegmentList lists the complementary parts of the addresses of the different fragments:
  "C_SD_1000k_h264_1.m4s" for the first fragment of the content "C" at 1000 kilobits per second ("kb"), in 800×600 format (SD),
  "C_SD_1000k_h264_2.m4s" for the second fragment,
  etc.

Once it has these fragment addresses, the terminal may then obtain multimedia content fragments via a download at these addresses. For example, the compound address corresponding to the content C at the lowest resolution and bit rate is of the type:
  http://server.com/video/h264/C_SD_1000k_h264(_X).m4s.

According to this example, the generation of the addresses takes place on the electronic stick itself; of course, this variant assumes that the stick has sufficient hardware and software means to access the manifest file, analyze it and generate the correct address corresponding to the command received.

According to the invention, a "Connection Capability File", abbreviated as FCC (2) has been previously installed on the device. The management module according to the invention is able to retrieve the current connection characteristics (according to this example, electrical and network connections) associated with the stick CTV at a given time, to compare them with the capabilities recorded in this file, then, depending on the results of the comparison, to accept or refuse the service conditionally at a given instant, according to a method which will be described later with reference to FIG. 3. For example, if the requested content is at a high bit rate in HEVC and the stick is supplied with power via USB, the user will be informed that this power supply is not sufficient and that they will have to connect the stick to the mains to benefit from the high speed/high definition service.

Figure 2:
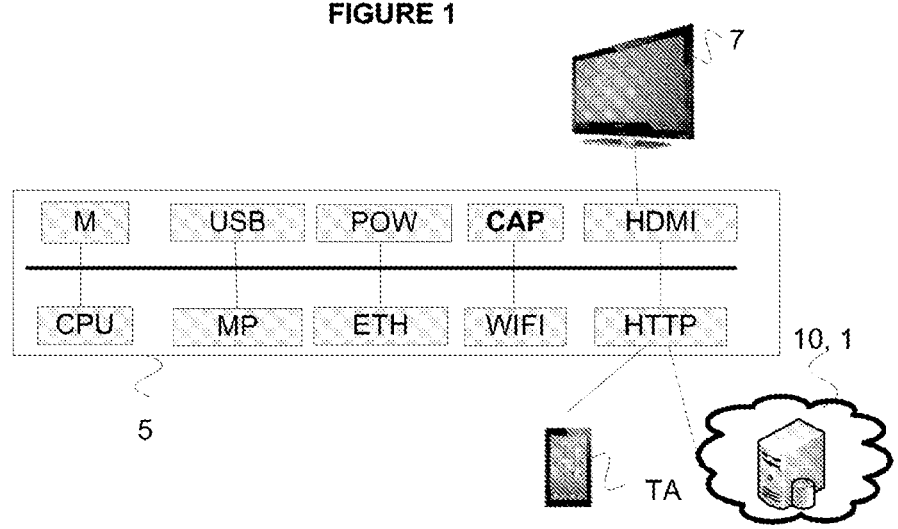
FIG. 2 shows a hardware architecture of an electronic stick according to one embodiment of the invention.

FIG. 2 shows a hardware architecture of a processing device according to one embodiment of the invention, for example a TV stick.

The device comprises memories M organized around a processor (CPU). According to this example, it includes:
  a radio communication module (WiFi) which allows it to connect wirelessly (for example, but not limited to, via a Wi-Fi radio channel) to the terminals of the network, in particular the mobile devices (TA) and the service gateway (6);
  a wired communication module (ETH) which allows it to connect by wire (for example, but not limited to, via an Ethernet cable) to the terminals of the network, in particular the service gateway;
  an HTTP communication module for providing the HTTP client-server communications, in particular for the purpose of exchanging data with the mobile terminals (TA) of the local area network (exchanging identities, receiving streaming commands, acknowledgments, etc.) and with the content server in the WAN via the service gateway;
  a serial power supply module (USB);
  a mains power supply module (POW);
  an interface module (HDMI) capable of physically and logically interfacing with the television (7) for transmitting the decoded multimedia (audio and video) content and exchanging basic commands from the mobile (silent mode, increase volume, decrease volume, etc.) and display commands according to one embodiment;
  a capability management module (CAP) according to the invention, responsible for managing the capabilities of the stick CTV according to the embodiment described above with reference to FIG. 1. This module is in particular capable, in relation to embodiments of the invention:
    of analyzing the request from a terminal (TA) and of deducing therefrom which characteristic(s) of the content have to be selected; the available bandwidth and the capability of the rendering device may also be conventionally examined at this stage;
    of deducing from the request the required (electrical or network) supply capabilities corresponding to the capabilities of the requested content;
    of comparing the required capabilities with the actual capabilities of the system;

if the device's capabilities are insufficient, of preparing an alert message for the user;
of sending the alert message to the terminal (TA) and/or the television (TV).
a "media player" (MP) capable of rendering (receiving, decoding, preparing) the streams in streaming mode and of delivering them to the rendering device (TV); the "media player" includes, inter alia, a set of decoders (audio, video, etc. decoders) capable of decoding the multimedia content, as well as an interface for communication with the mobile device, capable of interpreting the orders therefrom.

Figure 3:
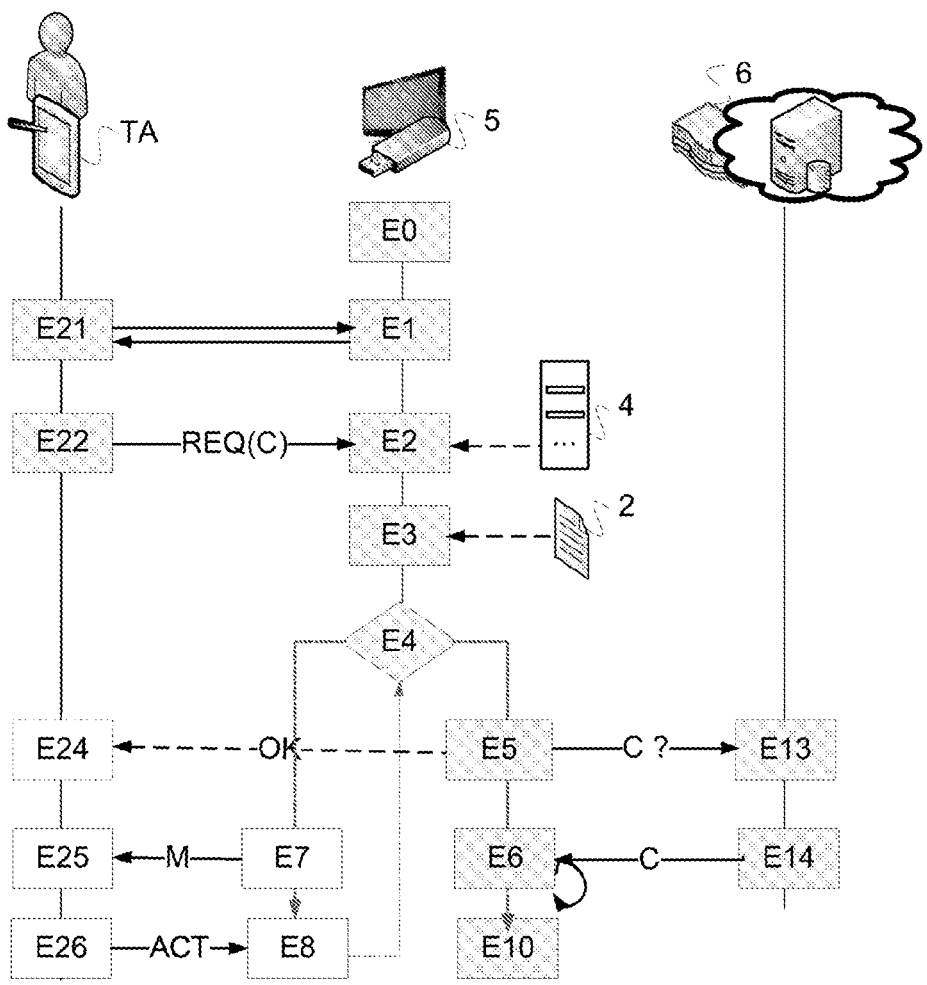
FIG. 3 shows a timing diagram of the exchanges between a control terminal and an electronic stick associated with a television according to one embodiment of the invention.

FIG. 3 shows a timing diagram of the exchanges between a control terminal (TA), an electronic stick (CTV, 5) associated with a television (TV) and a content server (3) according to one embodiment of the invention.

In a step E0, the TV stick (5) is initialized; the capabilities of the stick may be predefined in a Connection Capability File (2, FCC), installed in the memory of the device. It may be ROM, EPROM, etc. storage. Alternatively, this capability file may be set up and/or completed on the fly, while running programs on the stick, that is to say the stick may learn what its possible connections are.

An example of the content of such a file, which is in the memory of the stick, is illustrated below in the form of a table; it includes:
the identifier of the stick CTV;
a column "MEDIA" indicating the media type of a content, the coding type (for example MPEG4) and the resolution (for example SD) which are supported, and a range of associated bit rates (1 Mbit/s to 3 Mbit/s);
a "CONNECTION" column indicating the type of connection supported by the processing device for one or more functions. According to this example, the device supports two functions:
  a network function (NET) indicates the types of possible connections between the gateway and the stick, according to this example Wi-Fi (WIFI) or Ethernet (ETH);
  a power supply function (ALIM) indicates the types of possible connections for supplying the device with power; the possible power supply modes are in this case serial (USB) or mains (SEC), and the power supply unit has two powers 1 and 2 (SEC1 and SEC2); for example, the user uses a power supply which is not envisaged for the stick (SEC1) and delivers a lower power or the original power supply for the stick (SEC) which delivers a higher power;
a message column (MESSAGE) to indicate to the user the measures to be taken to remedy a deficiency in the connections required to render a given content.
For example:
line 4: the decoding of a video content in MPEG4/SD, the bit rate of which is between 1 and 3 Mbit/s, does not require capabilities other than a conventional USB power supply (ALIM column) and Wi-Fi reception (NET column). No alert should be sent to the user in this case, regardless of the configuration of the stick;
line 7: the decoding of a video content in HEVC/4K, the bit rate of which is between 10 and 25 Mbit/s, requires a substantial receiving capability and therefore an Ethernet link (ETH, NET column), and a high decoding power which may be obtained only if the stick is in level 2 mains power supply mode (SE2, ALIM column)). In this case, an alert should be sent to the user to alert them to connect the stick to the mains SEC2 using the original power supply if this is not already the case and/or via Ethernet if the stick is operating over Wi-Fi. The message to be sent proposed here by way of example is (MESSAGE column): "Connect the stick via original power supply and Ethernet". Of course, this message will be sent only if the stick is not already connected in these modes. This therefore assumes a prior analysis of the current state of the stick's connections.

TABLE 1 example table of the Capability File (FCC) of the device "ID_C = Orange stick 666777"

| Media (M) | MEDIA Coding (ENC) | Bit rate (R) | CONNECTION NET | ALIM | MESSAGE |
|---|---|---|---|---|---|
| video | MPEG4/SD | 1-3 Mbit/s | WiFi | USB | — |
|  | MPEG4/HD | 3-8 Mbit/s | WiFi | USB | — |
|  | HEVC/HD | 4-12 Mbit/s | WiFi | SEC1 | Connect stick |
|  | HEVC/4K | 10-25 Mbit/s | ETH | SEC2 | Connect stick via original power supply and Ethernet |
|  | MVC | 8-20 Mbit/s | WiFi | SEC2 | Connect stick via original power supply |
| audio | MP3 | 128 kb/s | WiFi | USB |  |
|  | AC3 | 384 kb/s | WiFi | SEC1 | Connect stick |

In a step E21 (E1), the user's terminal TA connects to the TV stick CTV. This connection is made conventionally between the two devices, by communication between a mobile application running on the terminal TA and a corresponding application on the TV stick CTV.

In a step E22, the terminal TA submits a request to receive a content C via the stick CTV (5) and to render it on its TV. This request is received in step E2 by the stick CTV, which analyzes it. For example, the request is of the type "rendering the content C in HD on the TV".

The module CAP of the stick CTV accesses the description file MPD in this step E2. It may download it for example from the content server (3), or from the service gateway, or access it locally, etc. It deduces therefrom the detailed characteristics of the content requested of it. The TV stick analyzes the description file and deduces therefrom that it has to provide the content C in high definition at 10 Mbit/s in HEVC, corresponding to the following URL (for the first fragment) if reference is made to the manifest file given by way of example in annex 1:
  http://server.com/video/h265/
    C_1080_p_10000k_h265_1. m4s.

In a step E3, the stick CTV consults the capability file FCC that it has stored and takes note of the current configuration of the device corresponding to the different functions in this file. According to the example provided in the table above, the module CAP of the stick CTV obtains the current state of the stick relating to the two functions (ALIM and NET connection modes) in question. For example:
  the TV stick is connected by Wi-Fi and connected to the mains (SEC1),
  the TV stick is connected by Ethernet (ETH) and supplied with power by USB,
  etc.

In a step E4, the module CAP of the stick CTV analyzes the capabilities required for the requested media and compares them with the current connections of the stick. In this example, it has to deliver HD content in HEVC at a speed of 10 Mbit/s (line 6 of table 1); for this it has to provide the following two functions: a Wi-Fi connection to the network and a mains connection of minimum SEC 1. Depending on the case, the comparison, or adequacy test, will be negative (the service cannot be provided as is) or positive (the service can be provided as is). According to this example:
- if the TV stick is connected by Wi-Fi or Ethernet and connected to the mains, the test is positive, it does not prepare a message;
- if the TV stick is connected by Wi-Fi or Ethernet and supplied with power by USB, the test is negative, it prepares the error message "Connect the stick".

If the content can be rendered as is, it agrees to the request. It optionally transmits an acknowledgment to the terminal in a next step E5, then requests the content from the server and starts downloading and rendering the requested content C in step E6 (rendering represented by the curved arrow). The "Media Player" (MP) receives the content from the service gateway, decodes it, formats it, plays it as it is received and transmits it to the associated rendering device (TV).

Otherwise, if the capabilities of the requested content do not correspond to the current connections, that is to say if the adequacy test in step E4 is negative, step E4 is followed by a step E7, in which a message is transmitted to the user asking them to activate, for at least one function, a connection required for rendering: connection to the mains, Ethernet connection, etc.

According to the example provided above, it transmits the message M: "Connect the stick" to the user's mobile terminal.

According to yet another example, the TV stick is connected by Wi-Fi and connected to the mains using a SEC1 power charger; if the requested content (HEVC stream in 4K at 25 Mbit/s) requires (line 7, table 1) a power supply supplied originally with the device (SEC2) and an Ethernet connection to the service gateway, the message displayed on the user is of type: "Connect the stick via original power supply and Ethernet".

In a step E26, the user performs such a connection action, taken into account in a step E8 (for example, the electrical state of the stick is changed from a USB power supply state to a mains power supply state since the user has connected their stick).

The module CAP on the stick then goes back to step E4 to check that the requested action has indeed been performed. If so, it continues with step E5 to stream the content.

If not, the content will not be rendered and it may go back to step E7 or stop the program.

Step E10 ends the rendering of the content.

It goes without saying that the embodiment which has been described above has been provided solely by way of indication and is in no way limitative, and that numerous modifications may easily be made by those skilled in the art without departing from the scope of the invention.

In particular, other types of connections may be envisaged:
- display connectors (for example, the stick may be connected to a rendering device by VGA or HDMI);
- memory connections (for example, the stick may be connected to an external hard drive which is useful only in certain cases of use, in particular if the content has to be recorded);
- etc.

Annex 1: Example of a Simplified MPEG-DASH Manifest File

ANNEX 1 example of a simplified MPEG-DASH manifest file

```
<?xml version="1.0"?>
<MPD xmlns:xsl="http://www.w3.org/2001/XMLSchema-instance"
    xmlns="urn:mpeg:DASH:schema:MPD:2011"
    xsi:schemaLocation= "urn:mpeg:DASH:schema:MPD:2011 DASH-MPD.xsd"
    type="dynamic"  profiles="urn:mpeg:dash:profile:isoff-live2011">
<BaseURL>HTTP://server.com/</BaseURL>
<!—durée du contenu -->
<Period duration="PT1H12M14.167S">
    <!— vidéo du contenu C en MPEG4-->
    <AdaptationSet lang="eng" par="16:9" maxFrameRate="24" maxHeight="1080"
    maxWidth="1920" group="1" id="1">
        <!—URL de base pour contenus MPG4-->
        <BaseURL>video/h264/</BaseURL>
            <!-- Contenu C en SD á 1 Mbps-->
            <Representation id="SD" codecs="avc1" mimeType="video/mp4"
            width="800 " height="600" startWithSAP="1" bandwidth="1000000">
                < SegmentList duration="10">
                    <SegmentURL media="C_SD_1000k_h264_1.m4s"/>
                    <SegmentURL media="C_SD_1000k_h264_2.m4s"/>
                    ....
                </ SegmentList >
            </Representation >
            <!-- Contenu C en 720p á 3.2 Mbps -->
            <Representation id="720p" codecs="avc1" mimeType="video/mp4"
            width="1280" height="720" bandwidth="3200000">
                <SegmentList duration="10">
                    <SegmentURL media="C_720p_3200k_h264_1.m4s"/>
                    ....
                </SegmentList>
            </Representation>
    </AdaptationSet>
    <!— vidéo du contenu C en HEVC-->
    <AdaptationSet    lang="eng"    par="16:9"    maxFrameRate="24"
    maxHeight="1080" maxWidth="1920" group="1" id="1">
```

ANNEX 1-continued example of a simplified MPEG-DASH manifest file

```
        <!—URL de base pour contenus HEVC-->
        <BaseURL>video/h265/</BaseURL>
            <Representation id="3" codecs=" hev1.1.6" mimeType="video/mp4"
            frameRate="24" width="1920" height="1080" bandwidth="10000000">
            <!-- Contenu C en HD á 10 Mbps -->
                < SegmentList duration="10">
                    <SegmentURL media="C_1080p_10000k_h265_1.m4s"/>
                    <SegmentURL media="C_1080p_10000k_h265_2.m4s"/>
                    ....
                </ SegmentList >
        </AdaptationSet>
    <!— audio du contenu C -->
        <AdaptationSet lang="eng" id="3" segmentAlignment="true">
        <BaseURL>audio/mp4a/</BaseURL>
                    ....
</MPD>
```

The invention claimed is:

1. A method comprising:

managing connections of a device for processing multimedia content that has at least two distinct connections of given types for providing a power function and at least one connection of a wired type and at least one connection of a wireless type for providing a network function, wherein said managing comprises, on the processing device connected to first current connections for the power and network functions, acts of:

receiving a request to process a multimedia content and determining at least one media characteristic of said multimedia content based on the request;

identifying the types of said first current connections for the power function and the network function of the device;

determining at least one suitable connection type for the power function and at least one suitable connection type for the network function based on said media characteristic;

comparing said suitable connection types with the first current connection types for the power function and the network function; and depending on a result of the comparing, sending an alert message that includes an instruction to change the first current connection for at least one of the power function or the network function of the device to a new current connection, distinct from the first current connection.

2. The method as claimed in claim 1, wherein the power function relates to a power supply of the device.

3. The method as claimed in claim 2, wherein the new current connection is a serial or mains connection.

4. The method as claimed in claim 1, wherein the network function relates to a data network access of the device.

5. The method as claimed in claim 4, wherein the new current connection is a wired connection.

6. The method as claimed in claim 1, wherein at least one of the power function or the network function relates to the device rendering multimedia data.

7. The method as claimed in claim 1, wherein the request is a request for progressive download of the multimedia content and the method further includes analyzing the request, including the following sub-acts:

obtaining a file describing the content; and analyzing the file to extract therefrom the at least one media characteristic of said multimedia content.

8. The method as claimed in claim 1, wherein the request to process the content is received from a control terminal and the alert message is sent to said control terminal for rendering thereof.

9. The method as claimed in claim 1, wherein the processing device is connected to a content rendering device, and the alert message is sent to said rendering device.

10. The method as claimed in claim 1, wherein the characteristic of the content is a coding characteristic.

11. The method as claimed in claim 1, wherein the characteristic of the content is a bit rate characteristic.

12. A device for processing multimedia content which includes:

at least two distinct connections of given types for providing a power function;

at least one connection of a wired type and at least one connection of a wireless type for providing a network function;

a processor; and a non-transitory computer-readable medium comprising instructions stored thereon, which when executed by the processor configure the device to:

receive a request to process a multimedia content and determine at least one media characteristic of said multimedia content based on the request, said device being connected to first current connections for the power function and the network function;

identify the type of said first current connection for the power function and the type of said first current connection for the network function of the device;

determine at least one suitable connection type for the power function and at least one suitable connection type for the network function based on said media characteristic;

compare said suitable connection types with the first current connection types for the power function and the network function; and depending on a result of the comparing send an alert message that includes an instruction to change the first current connection for at least one of the power function or the network function of the device to a new current connection, distinct from the first current connection.

13. A TV stick comprising the processing device according to claim 12.

14. A system comprising the processing device according to claim 12, a control terminal and a rendering terminal.

15. A non-transitory computer-readable medium comprising a computer program recorded thereon, including code instructions for implementing a method for managing connections of a device for processing multimedia content, when the instructions are executed by a processor of the device, wherein the instructions configure the device to:

manage the connections of the device, which has at least two distinct connections of given types for providing a power function and at least one connection of a wired type and at least one connection of a wireless type for providing a network function, the device being connected to first current connections for the power and network functions, wherein said managing comprises:

receiving a request to process a multimedia content and determine at least one media characteristic of said content based on the request;

identifying the types of said first current connections for the power function and the network function of the device;

determining at least one suitable connection type for the power function and at least one suitable connection type for the network function based on said media characteristic;

comparing said suitable connection types with the first current connection types for the power function and the network function; and depending on a result of the comparing, send an alert message that includes an instruction to change the first current connection for at least one of the power function or the network function of the device to a new current connection, distinct from the first current connection.

* * * * *